US012092043B2

(12) United States Patent
Hanawa

(10) Patent No.: US 12,092,043 B2
(45) Date of Patent: Sep. 17, 2024

(54) CONTROL DEVICE OF INTERNAL COMBUSTION ENGINE, AND INTERNAL COMBUSTION ENGINE

(71) Applicant: Isuzu Motors Limited, Yokohama (JP)

(72) Inventor: Satoshi Hanawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 0 days.

(21) Appl. No.: 18/275,817

(22) PCT Filed: Feb. 4, 2022

(86) PCT No.: PCT/JP2022/004444
§ 371 (c)(1),
(2) Date: Aug. 4, 2023

(87) PCT Pub. No.: WO2022/168946
PCT Pub. Date: Aug. 11, 2022

(65) Prior Publication Data
US 2024/0117775 A1 Apr. 11, 2024

(30) Foreign Application Priority Data
Feb. 5, 2021 (JP) ................................ 2021-017667

(51) Int. Cl.
*F02D 13/02* (2006.01)
*F02D 41/00* (2006.01)
*F02D 41/18* (2006.01)

(52) U.S. Cl.
CPC ....... *F02D 13/0234* (2013.01); *F02D 41/009* (2013.01); *F02D 41/182* (2013.01); *F02D 2200/0411* (2013.01)

(58) Field of Classification Search
CPC .................... F02D 13/0234; F02D 2200/0411
See application file for complete search history.

(56) References Cited

U.S. PATENT DOCUMENTS

| | | | |
|---|---|---|---|
| 2002/0078924 | A1 | 6/2002 | Yagi |
| 2013/0239669 | A1 | 9/2013 | Hagari et al. |

FOREIGN PATENT DOCUMENTS

| | | |
|---|---|---|
| JP | 2002-201998 | 7/2002 |
| JP | 2006-105109 | 4/2006 |

(Continued)

OTHER PUBLICATIONS

International Search Report and the Written Opinion Dated Mar. 29, 2022 From the International Searching Authority Re. Application No. PCT/JP2022/004444 and Its Translation of Search Report Into English. (9 Pages).

*Primary Examiner* — Ngoc T Nguyen

(57) ABSTRACT

Provided are a control device for an internal combustion engine, wherein the internal combustion engine is provided with a crank mechanism for converting a reciprocating motion of a piston into a rotating motion of a crankshaft, a cylinder accommodating the piston, and an intake valve capable of opening and closing an inlet for sucking gas into the cylinder, and the control device is provided with: a volumetric efficiency calculating unit for calculating a volumetric efficiency representing a suction efficiency when gas is sucked into the cylinder, on the basis of a cylinder capacity when the intake valve is closed; a gas suction amount calculating unit for calculating a gas suction amount sucked into the cylinder, by means of a predetermined formula, on the basis of the calculated volumetric efficiency; and a control unit for controlling the internal combustion engine on the basis of the calculated gas suction amount.

6 Claims, 7 Drawing Sheets

(56) References Cited

FOREIGN PATENT DOCUMENTS

| | | |
|---|---|---|
| JP | 2008-267209 | 11/2008 |
| JP | 2010-116884 | 5/2010 |
| JP | 2013-036355 | 2/2013 |
| JP | 2013-185504 | 9/2013 |
| JP | 2013-194587 | 9/2013 |
| JP | 2013-221418 | 10/2013 |
| WO | WO 2014/125748 | 8/2014 |

CONTROL DEVICE OF INTERNAL COMBUSTION ENGINE, AND INTERNAL COMBUSTION ENGINE

TECHNICAL FIELD

The present disclosure relates to a control apparatus for an internal combustion engine, and an internal combustion engine.

BACKGROUND ART

An intake gas amount has been known, for example, as one of engine parameters for controlling an internal combustion engine (also simply referred to as an engine) (e.g., see Patent Literature (hereinafter referred to as "PTL") 1).

As a sensor for detecting the intake gas amount, there has been known an air-flow sensor (Mass Airflow sensor; hereinafter referred to as a MAF sensor) that is installed on an intake pipe of the engine. Besides, there has been known a speed-density mode for obtaining the intake gas amount by an arithmetic computation using engine parameters other than the intake gas amount. Introduction of the speed-density mode enables comparing between a computed value obtained by the speed-density mode and a detected value obtained by the MAF sensor, thereby diagnosing and calibrating the MAF sensor. Further, the computed value obtained by the speed-density mode can be replaced with the detected value and then used for engine control. Incidentally, using only the computed value obtained by the speed-density mode for the engine control makes it possible to provide an inexpensive vehicle without the MAF sensor.

The intake gas amount is given by the following arithmetic expression:

[1]

$$m_{intk} = \frac{p_{us}\eta_s Q_{ref}}{RT_{us}} = \rho\eta_s Q_{ref} \quad Q_{ref} = \frac{niV_H}{60}. \qquad \text{(Expression 1)}$$

The following are used, herein:

- $m_{intk}$=Intake gas amount [kg/s];
- R=Gas constant for air [J/kgK];
- $T_{us}$=Intake temperature (intake manifold temperature) [K];
- $P_{us}$=Intake pressure (intake manifold pressure) [Pa];
- $\eta_s$=Volumetric efficiency [-];
- $Q_{ref}$=Reference intake gas flow [m3/s];
- ρ=Intake gas density [kg/m3];
- n=Engine speed [rpm];
- i=½: for four-stroke engine; and
- $V_H$=Exhaust volume [l].

The gas constant for air is a fixed value. The intake temperature is an intake-air temperature (absolute temperature) in an intake manifold and is based on a detection result by an intake-temperature sensor. The intake pressure is an intake-air pressure in the intake manifold and is detected by a boost-pressure sensor. An atmospheric pressure is detected by an atmospheric-pressure sensor. Since the intake pressure is detected as a gauge pressure, adding thereto the atmospheric pressure results in an absolute pressure. A total exhaust volume is a value specific to an engine. The engine speed is detected by a crank-angle sensor. The volumetric efficiency is a constant expressed by a ratio of an actual intake gas amount to an ideal intake gas amount determined from the temperature/pressure of the intake air and a stroke volume.

CITATION LIST

Patent Literature

PTL 1

Japanese Patent Application Laid-Open No. 2013-185504

SUMMARY OF INVENTION

Technical Problem

In the conventional techniques, a volumetric efficiency is calculated based on a stroke volume assuming that an intake valve closes at a bottom dead center. An error that occurs between the assumed stroke volume and a volume of a cylinder when the intake valve actually closes (hereinafter referred to as "actual cylinder-volume") has been absorbed by calibration of the volumetric efficiency.

Hence, in a case where the intake valve does not close at the bottom dead center in actual, an accurate volumetric efficiency cannot be calibrated. Consequently, the accuracy for an intake gas amount required by the speed-density mode may be reduced. This may lower the controllability of an exhaust gas recirculation (EGR) device, thereby deteriorating an exhaust-gas condition, for example.

It is an object of the present disclosure to provide a control apparatus for an internal combustion engine and an internal combustion engine each capable of improving the accuracy for an intake gas amount.

Solution to Problem

In order to achieve the above object, a control apparatus for an internal combustion engine according to the present disclosure is a control apparatus for an internal combustion engine including a crank mechanism for converting a reciprocating motion of a piston into a rotational motion of a crank shaft, a cylinder for housing the piston, and an intake valve capable of opening and closing a port for intake of gas into the cylinder, the control apparatus including:

- a volumetric-efficiency calculation section that calculates, based on a cylinder-volume when the intake valve closes, a volumetric-efficiency indicating intake-efficiency in intake of gas into the cylinder;
- an intake-gas-amount calculation section that calculates with a previously determined formula, based on the calculated volumetric-efficiency, an intake gas amount to be taken into the cylinder; and
- a control section that controls the internal combustion engine based on the calculated intake gas amount.

An internal combustion engine according to the present disclosure includes:

- the control apparatus for the internal combustion engine; and
- a fuel injection apparatus for which an injection amount of fuel to be injected therefrom into a combustion chamber of the cylinder is controlled based on the intake gas amount calculated by the intake-gas-amount calculation section.

An internal combustion engine according to the present disclosure includes the control apparatus for the above internal combustion engine.

Advantageous Effects of Invention

According to the present disclosure, it is possible to improve the accuracy for an intake gas amount.

DESCRIPTION OF EMBODIMENTS

Figure 1:
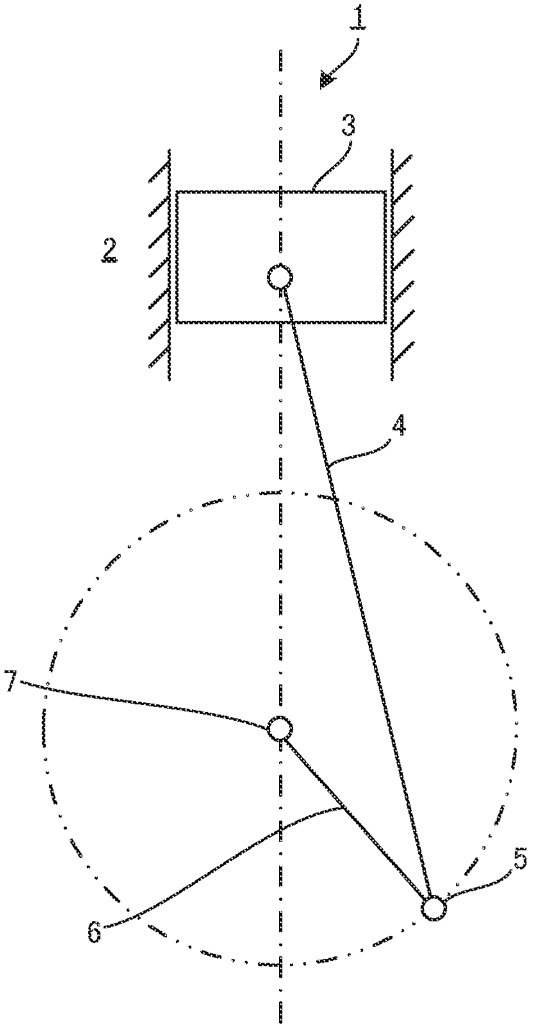
FIG. 1 schematically illustrates a crank mechanism for an internal combustion engine.

Hereinafter, an embodiment of the present disclosure will be described with reference to the accompanying drawings. FIG. 1 schematically illustrates a crank mechanism for internal combustion engine 1.

Internal combustion engine 1 according to the present embodiment is a diesel engine (hereinafter simply referred to as an "engine"). As illustrated in FIG. 1, engine 1 includes cylinder 2, piston 3, connecting rod (con rod) 4, crank pin 5, crank arm 6, and crank shaft 7. Piston 3 is positioned in cylinder 2 so as to be reciprocatable between a top dead center and a bottom dead center. Con rod 4 couples piston 3 with crank pin 5. Crank arm 6 couples crank pin 5 with crank shaft 7. The reciprocating motion of piston 3 is transmitted to crank shaft 7 through con rod 4, crank pin 5, and crank arm 6 and is thereby converted into rotational motion.

Figure 2A:
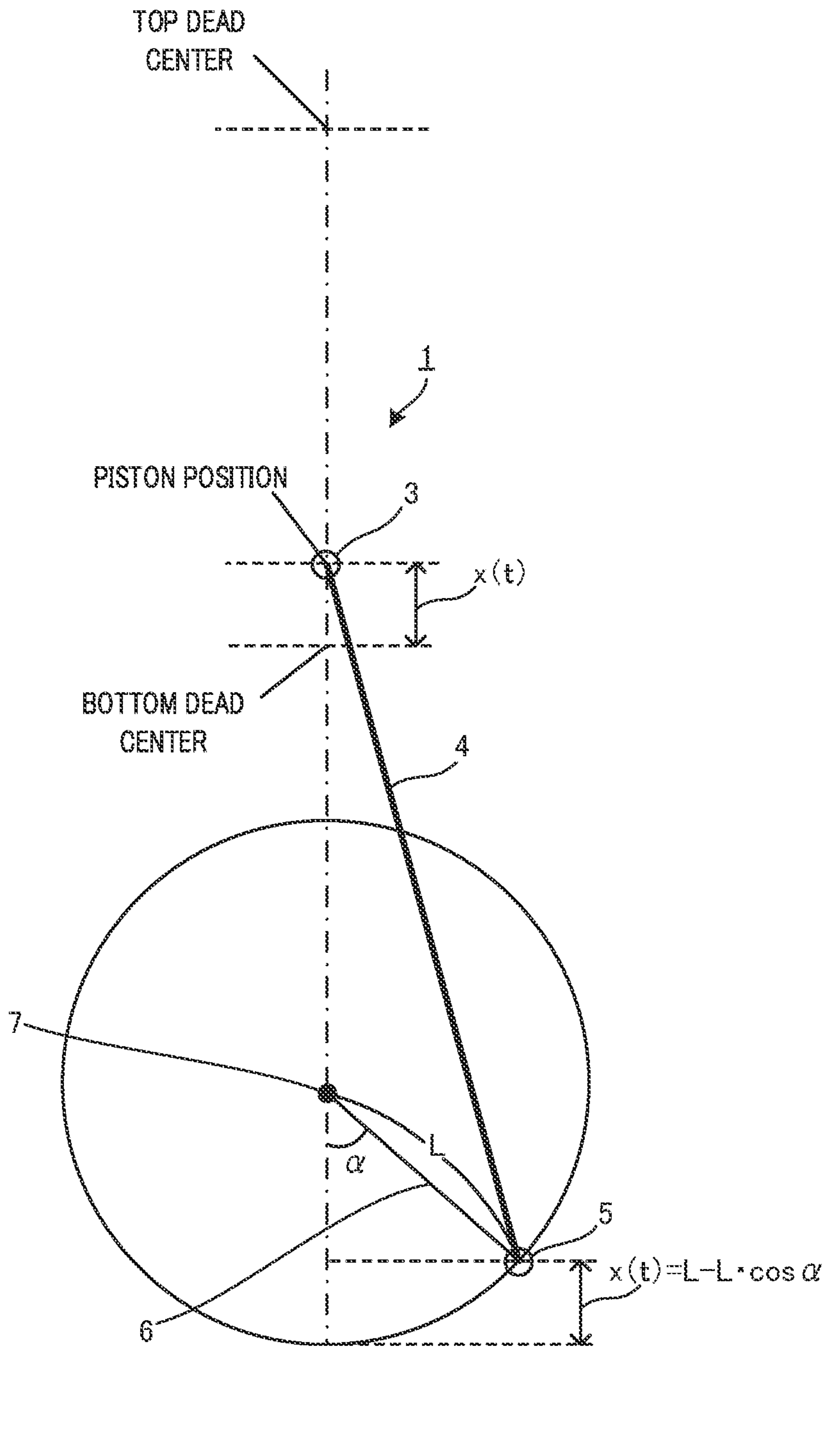
FIG. 2A illustrates a position of a piston when a crank angle is a predetermined angle.
Figure 2B:
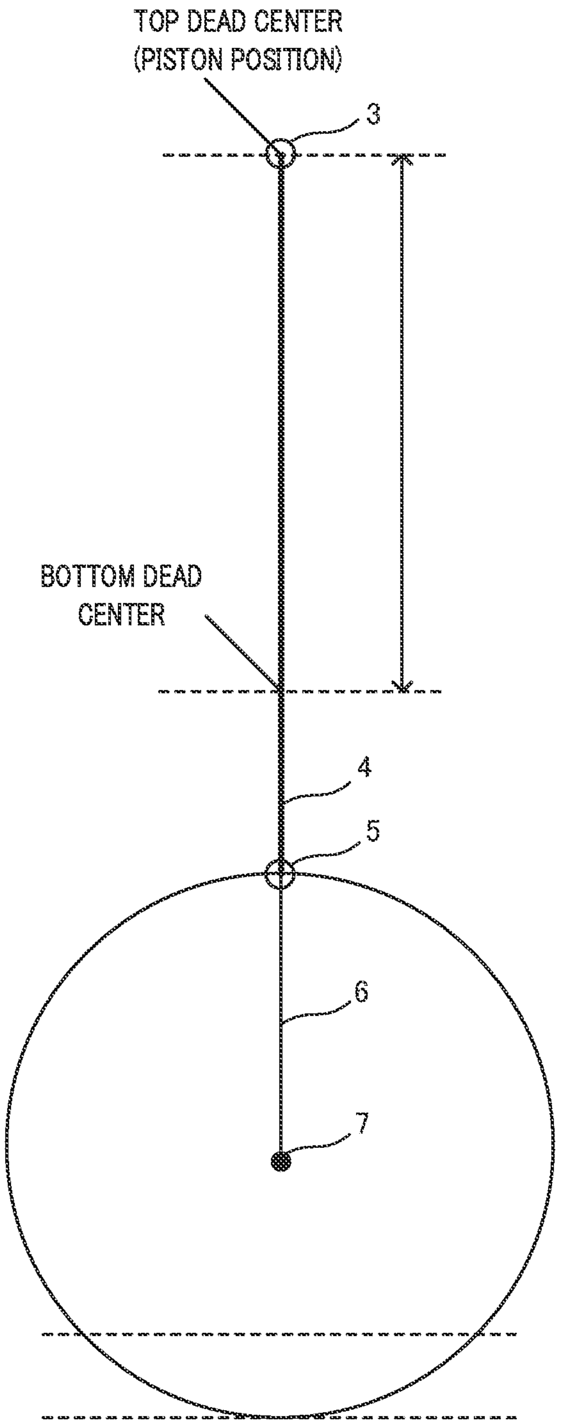
FIG. 2B illustrates a position of the piston when reaching a top dead center.
Figure 2C:
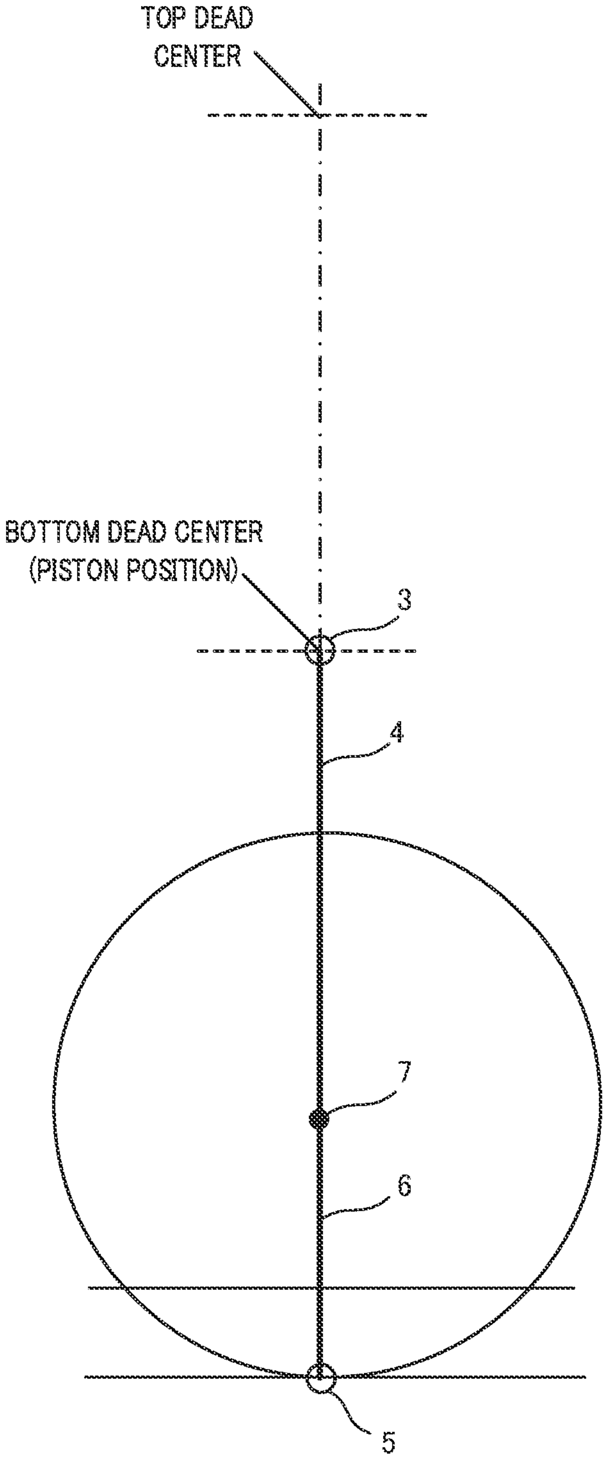
FIG. 2C illustrates a position of the piston when reaching a bottom dead center.

FIG. 2A illustrates a position of piston 3 when a crank angle is a predetermined angle. FIG. 2B illustrates a position of piston 3 when reaching the top dead center. FIG. 2C illustrates a position of piston 3 when reaching the bottom dead center. FIG. 2A illustrates a crank angle, α, a length of crank arm 6, L, and displacement of piston 3, x(t). Here, the displacement of the piston refers to a distance between a position of the piston when reaching the bottom dead center and a position of the piston in the case of crank angle, α. The displacement x(t) of piston 3 in the case of crank angle, α, is expressed by the following equation:

$$X(t)=L-L\cdot\cos\alpha \qquad \text{(Equation 1).}$$

Further, a cylinder-volume, V, (actual cylinder-volume) in the case of crank angle, α, is expressed by the following equation:

$$V=V_{cyl}-\pi r^2\cdot x(t) \qquad \text{(Equation 2).}$$

Here, $V_{cyl}$ indicates a difference between a cylinder-volume when piston 3 is positioned in the top dead center and a cylinder-volume when piston 3 is positioned in the bottom dead center (stroke volume), and r indicates a radius of piston 3.

The actual cylinder-volume, V, can be calculated from the (constant) length, L, of crank arm 6, the (constant) stroke volume, $V_{cyl}$, the (constant) radius, r, of piston 3, and the crank angle, α, with reference to above Equations 1 and 2.

As described above, the actual cylinder-volume can be calculated from a crank angle. Hence, for example, when a crank angle at the time of closing of an intake valve is switched in a system in which the intake valve performs "early closing" or "late closing," the accuracy for the volumetric efficiency can be improved by executing processes of calculating the actual cylinder-volume from the switched crank angle and then calculating the volumetric efficiency based on the actual cylinder-volume (former method). Incidentally, without limitation to this, in a case where the crank angle at the time of closing of the intake valve is known in advance, a correspondence relation between a crank angle and a cylinder-volume may be stored in advance, and thus, when a crank angle at the time of closing of the intake valve is switched, the accuracy for the volumetric efficiency can be improved by executing a process of calculating the volumetric efficiency based on the previously stored cylinder-volume corresponding to the switched crank angle (latter method).

The former method will be described first, and thereafter, the latter method will be described as a variation of the present embodiment.

Figure 3:
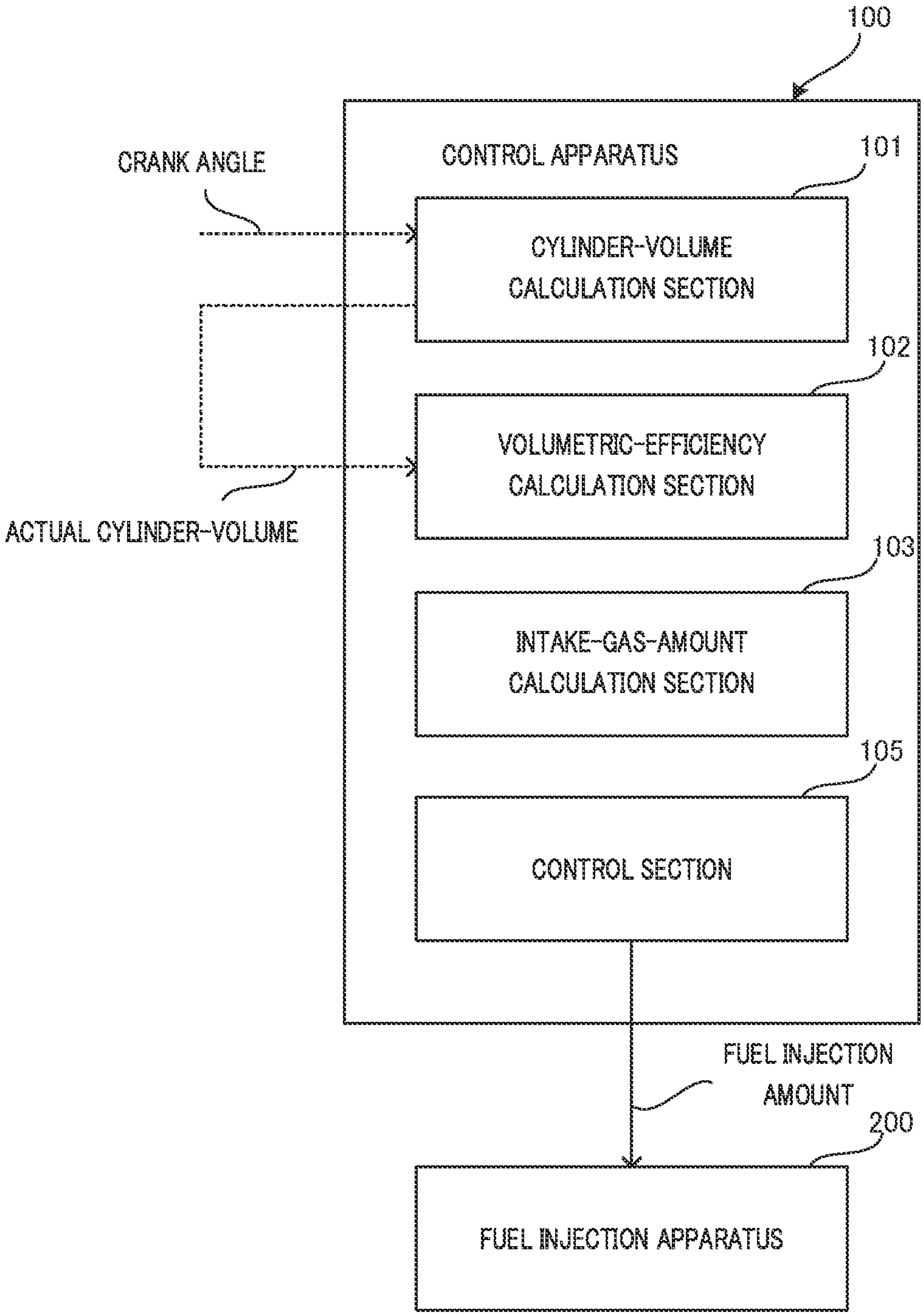
FIG. 3 is a block diagram illustrating an exemplary configuration of the internal combustion engine according to an embodiment of the present disclosure.

FIG. 3 is a block diagram illustrating an exemplary configuration of control apparatus 100 for the internal combustion engine according to the present embodiment. Control apparatus 100 is mounted on an electronic control unit (hereinafter referred to as an ECU) of a vehicle. The ECU includes a Central Processing Unit (CPU), Random Access Memory (RAM), Read Only Memory (ROM), an input device, and an output device. The CPU executes the functions described later by loading into the RAM a program stored in the ROM.

A crank angle, α, when an intake valve closes (see FIG. 2A) is detected by, for example, a crank-angle sensor (not illustrated). The detected crank angle, α, is input to the input device of control apparatus 100.

Control apparatus 100 includes cylinder-volume calculation section 101, volumetric-efficiency calculation section 102, intake-gas-amount calculation section 103, and control section 105.

Cylinder-volume calculation section 101 calculates an actual cylinder-volume with the above Equations 1 and 2, based on the crank angle, α.

Volumetric-efficiency calculation section 102 calculates a volumetric efficiency with the speed density formula, for example, by using the calculated actual cylinder-volume, the actual intake gas amount, and engine parameters other than the intake gas amount. Here, for example, a detection result of the airflow sensor (MAF sensor) is used for the actual intake gas amount. In addition, parameters experimentally obtained at operating conditions or parameters obtained by simulation are used for the engine parameters. The obtained engine parameters (e.g., engine speed, temperature in intake manifold, pressure in intake manifold, and the like) are stored in the ROM of control apparatus 100.

Intake-gas-amount calculation section 103 calculates an intake gas amount with the speed density formula mentioned above, for example, based on the calculated volumetric efficiency and the like.

Control section 105 calculates, based on the intake gas amount, an injection amount (corresponding to injection time of fuel or energization time) to be injected into a combustion chamber (not illustrated) of cylinder 2, and thus controls fuel injection apparatus 200 based on the injection amount of fuel.

Fuel injection apparatus 200 includes an injector (not illustrated) that injects fuel therefrom into the combustion chamber of cylinder 2, a common rail (not illustrated) that reserves, in a high pressure state, fuel to be supplied to the injector, and a pressure pump (not illustrated) that pressure-feeds fuel to the common rail. An injection amount of fuel (corresponding to injection time of fuel or energization time) to be injected into the combustion chamber (not illustrated) of cylinder 2 is calculated, and thus, fuel injection apparatus 200 is controlled based on the injection amount of fuel.

Figure 4:
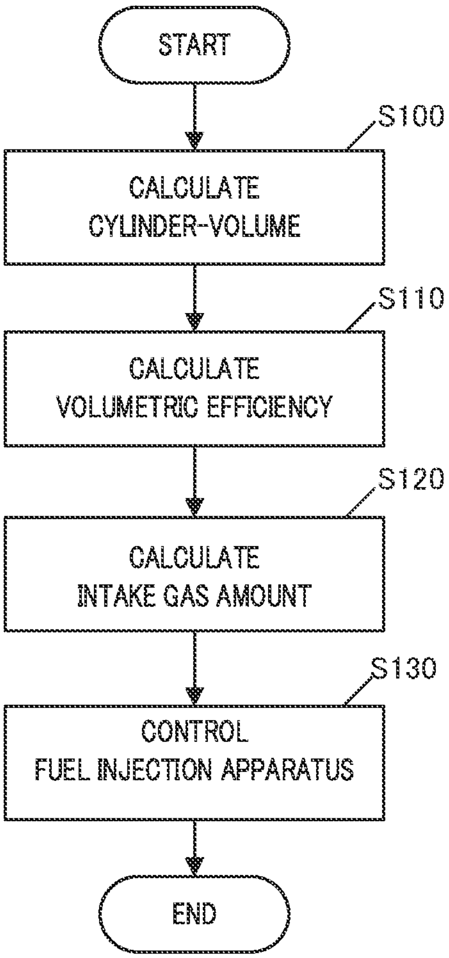
FIG. 4 is a flowchart describing an operation of a control apparatus for the internal combustion engine.

Next, an operation of control apparatus 100 for the internal combustion engine will be described with reference to FIG. 4. FIG. 4 is a flowchart describing an operation of control apparatus 100 for the internal combustion engine. In the following, a description will be given assuming that the functions of control apparatus 100 are executed by the CPU. Note that, into the CPU, a crank angle is input every predetermined time. This flow starts with a start of the engine.

First, in step S100, the CPU calculates an actual cylinder-volume based on a crank angle.

Next, in step S110, the CPU calculates a volumetric efficiency based on the actual cylinder-volume.

Next, in step S120, the CPU calculates an intake gas amount based on the volumetric efficiency.

Next, in step S130, the CPU controls fuel injection apparatus 200 based on the intake gas amount. Thereafter, the flow illustrated in FIG. 4 ends.

Control apparatus 100 for an internal combustion engine according to the present embodiment is control apparatus 100 for an internal combustion engine including a crank mechanism for converting reciprocating motion of piston 3 into rotational motion of crank shaft 7, cylinder 2 for housing piston 3, and an intake valve capable of opening and closing a port for intake of gas into cylinder 2, and the control apparatus includes: volumetric-efficiency calculation section 102 that calculates a volumetric-efficiency based on a cylinder-volume when the intake valve closes; intake-gas-amount calculation section 103 that calculates, based on the calculated volumetric-efficiency, an intake gas amount to be taken into cylinder 2; and control section 105 that controls engine 1 based on the calculated intake gas amount.

With the above-described configuration, the accuracy for the volumetric efficiency can be improved. Thus, an accurate volumetric efficiency can be calibrated, which makes it possible to, for example, improve the accuracy for the intake gas amount required by the speed-density mode.

Further, control apparatus 100 for the internal combustion engine according to the present embodiment includes cylinder-volume calculation section 101 that calculates a cylinder-volume based on a crank angle when an intake valve closes. Further, volumetric-efficiency calculation section 102 included therein calculates a volumetric efficiency based on the calculated cylinder-volume when the intake valve closes. This makes it possible to improve the accuracy for the volumetric efficiency because the volumetric efficiency is calculated based on the calculated actual cylinder-volume. Further, in a case where the intake valve has a system for "early closing" or "late closing," i.e., when the intake valve is configured to close at a timing selected from a plurality of previously determined timings and is switchable, and furthermore, when a timing (crank angle) at which the intake valve closes is switched, a cylinder-volume is calculated based on the switched timing (crank angle), and thus, the volumetric efficiency can be calculated based on the accurate cylinder-volume. As a result, the accuracy for the volumetric efficiency can be improved.

Figure 5:
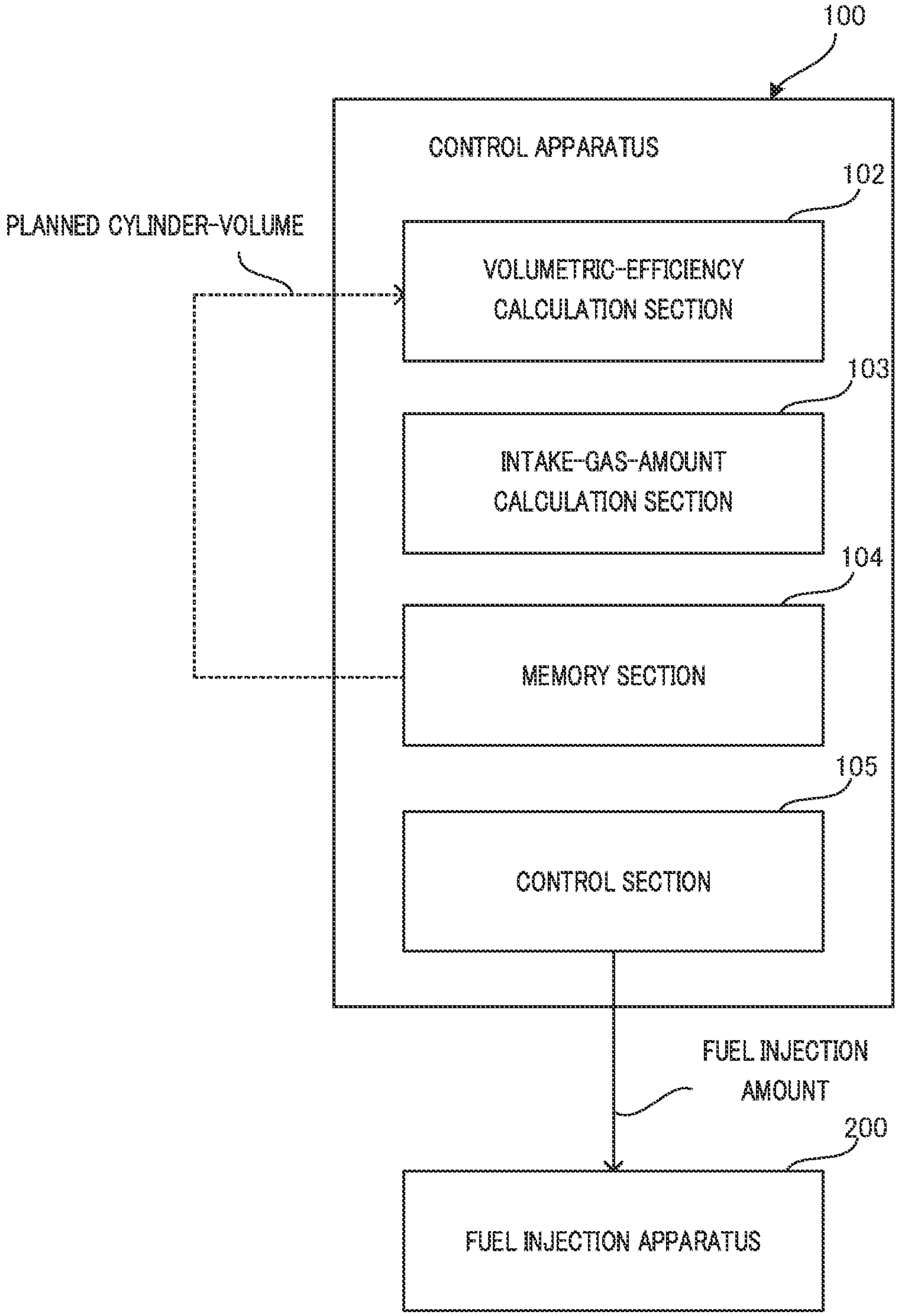
FIG. 5 is a block diagram illustrating an exemplary configuration of an internal combustion engine according to a variation of the embodiment of the present disclosure.

Next, a variation of the present embodiment will be described with reference to FIG. 5. A block diagram is provided for illustrating an exemplary configuration of an internal combustion engine according to the variation of the embodiment of the present disclosure. In the description of the variation, components different from the above-described embodiment will be mainly described, whereas the identical components are given the same reference numerals, and the descriptions thereof will be omitted.

In the above-described embodiment, cylinder-volume calculation section 101 calculates the actual cylinder-volume from a crank angle. In contrast, control apparatus 100 for the internal combustion engine according to the variation includes memory section 104 that stores a cylinder-volume when an intake valve closes at each of a plurality of previously determined timings (crank angles) (hereinafter each referred to as a "planned cylinder-volume"). Volumetric-efficiency calculation section 102 reads out, from memory section 104, the planned cylinder-volume when the intake valve closes and then calculates a volumetric efficiency based on the planned cylinder-volume that has been read out.

According to the variation, when the intake valve has a system for the "early closing" or the "late closing" (when timing (crank angle) at which intake valve closes is switched), the volumetric efficiency can be calculated based on the planned cylinder-volume when the intake valve closes at the switched timing (crank angle), thus improving the accuracy for the volumetric efficiency.

Further, the variation has an advantage of omitting the process of calculating a cylinder-volume based on a crank angle because the volumetric efficiency is calculated based on the planned cylinder-volume that is stored in advance.

The embodiment and variation described above are an merely examples of specific implementation of the present disclosure, and the technical scope of the present disclosure should not be restrictively interpreted by these embodiment and variation. That is, the present disclosure may be implemented in various forms without departing from the spirit thereof or the major features thereof.

The present application is based on Japanese Patent Application No. 2021-017667, filed on Feb. 5, 2021, the disclosure of which including the specification, drawings and abstract is incorporated herein by reference in its entirety.

INDUSTRIAL APPLICABILITY

The present disclosure is suitably used for an internal combustion engine equipped with a control apparatus that is required to improve the accuracy for an intake gas amount.

REFERENCE SIGNS LIST

1 Internal combustion engine (engine)
2 Cylinder
3 Piston
4 Con rod
5 Crank pin
6 Crank arm
7 Crank shaft
100 Control apparatus
101 Cylinder-volume calculation section
102 Volumetric-efficiency calculation section
103 Intake-gas-amount calculation section
104 Memory section
105 Control section
200 Fuel injection apparatus

The invention claimed is:

1. A control apparatus for an internal combustion engine including a crank mechanism for converting a reciprocating motion of a piston into a rotational motion of a crank shaft, a cylinder for housing the piston, and an intake valve capable of opening and closing a port for intake of gas into the cylinder, the control apparatus comprising:

a volumetric-efficiency calculation section that calculates, based on a cylinder-volume when the intake valve closes, a volumetric-efficiency indicating intake-efficiency in intake of gas into the cylinder;

an intake-gas-amount calculation section that calculates with a previously determined formula, based on the calculated volumetric-efficiency, an intake gas amount to be taken into the cylinder; and a control section that controls the internal combustion engine based on the calculated intake gas amount, wherein the intake valve is configured to close at a timing that is selected from a plurality of timings that is previously determined and that is a switchable timing of the plurality of timings, and wherein the control apparatus further comprises a memory section that previously stores a cylinder-volume when the intake valve closes at each of the plurality of timings, wherein in a case where the timing is switched, the volumetric-efficiency calculation section calculates the volumetric-efficiency based on the previously stored cylinder-volume when the intake valve closes at the timing that has been switched.

2. An internal combustion engine, comprising:

the control apparatus for the internal combustion engine according to claim 1; and a fuel injection apparatus for which an injection amount of fuel to be injected therefrom into a combustion chamber of the cylinder is controlled based on the intake gas amount calculated by the intake-gas-amount calculation section.

3. An internal combustion engine, comprising the control apparatus for the internal combustion engine according to claim 1.

4. A control apparatus for an internal combustion engine including a crank mechanism for converting a reciprocating motion of a piston into a rotational motion of a crank shaft, a cylinder for housing the piston, and an intake valve capable of opening and closing a port for intake of gas into the cylinder, the control apparatus comprising:

a volumetric-efficiency calculation section that calculates, based on a cylinder-volume when the intake valve closes, a volumetric-efficiency indicating intake-efficiency in intake of gas into the cylinder;

an intake-gas-amount calculation section that calculates with a previously determined formula, based on the calculated volumetric-efficiency, an intake gas amount to be taken into the cylinder; and a control section that controls the internal combustion engine based on the calculated intake gas amount, further comprising a cylinder-volume calculation section that calculates a cylinder-volume based on a crank angle when the intake valve closes, wherein the volumetric-efficiency calculation section calculates the volumetric-efficiency based on the calculated cylinder-volume when the intake valve closes.

5. An internal combustion engine, comprising:

the control apparatus for the internal combustion engine according to claim 4; and a fuel injection apparatus for which an injection amount of fuel to be injected therefrom into a combustion chamber of the cylinder is controlled based on the intake gas amount calculated by the intake-gas-amount calculation section.

6. An internal combustion engine, comprising the control apparatus for the internal combustion engine according to claim 4.

* * * * *